United States Patent [19]

Nagase

[11] 4,013,371
[45] Mar. 22, 1977

[54] JOINTING DEVICE

[75] Inventor: Mitsuo Nagase, Kurobe, Japan

[73] Assignee: Yoshida Kogyo Kabushiki Kaisha, Tokyo, Japan

[22] Filed: Oct. 9, 1975

[21] Appl. No.: 620,937

[30] Foreign Application Priority Data

Oct. 11, 1974 Japan .............................. 49-123445

[52] U.S. Cl. .................................. 403/187; 52/455; 52/656

[51] Int. Cl.² .......................................... F16B 7/18

[58] Field of Search ........................... 403/169–178, 403/187, 189, 231, 232; 52/455, 656, 758 H, 758 F

[56] References Cited

UNITED STATES PATENTS

| 3,546,834 | 12/1970 | Murawski | 52/243 X |
| 3,566,561 | 3/1971 | Tozer | 52/729 X |

Primary Examiner—Wayne L. Shedd
Attorney, Agent, or Firm—Hill, Gross, Simpson, Van Santen, Steadman, Chiara & Simpson

[57] ABSTRACT

A jointing device for securing a horizontal frame member to a vertical frame member comprises a strip having its longitudinal ends extending beyond the vertical width of the horizontal frame member and including a central portion extending substantially over said vertical width. There are provided first holes formed through the central portion of the strip and second holes formed adjacent the longitudinal ends of the strip. The strip is first screwed to a longitudinal edge of the horizontal frame member through the first holes and then screwed to an inner wall of the vertical frame member through the second holes, thereby coupling the frame members together.

3 Claims, 4 Drawing Figures

JOINTING DEVICE

BACKGROUND OF THE INVENTION

1. Field of the Invention

This invention relates to jointing devices and more particularly to a device for jointing or coupling horizontal frame members with vertical frame members of doors, window sashes and the like.

2. Prior Art

Various devices of the type described have been proposed in the art. A typical example includes angle joints which have substantially the same width as that of the frame members and which are screwed at one end to the horizontal frame members and at the other end to the vertical frame members for connecting or coupling these frame members together. Another known device comprises jointing blocks having one end fitted in the hollow horizontal frame members and having the other end disposed for receiving therethrough the vertical frame members, with the jointing blocks screwed to these frame members. Since however the screws connecting the jointing devices to the frame members are threaded therein in a direction normal to the plane of the frame members, these prior art devices have suffered from the drawbacks that the screws are prone to get loosened slowly over a period of time, thus reducing the coupling strength when subjected to repeated severe stresses applied to the screws in the horizontal direction. Furthermore, the prior art devices involve tedious, time-consuming steps of manufacture and hence increased production cost.

SUMMARY OF THE INVENTION

With the above-noted drawbacks in view, the present invention has for its object to provide a jointing device which ensures the secure jointing or coupling between the frame members for extended periods of time.

Another object of the invention is to provide a jointing device of the type described which enables the frame members to be joined or coupled together with utmost ease.

Yet another object of the invention is to provide a jointing device of the type described which is simple in construction and inexpensive to manufacture.

Briefly stated, these objects of the invention are achieved by a jointing device for securing horizontal frame members to vertical frame members which comprises in combination a horizontal frame member having vertically extending spaced walls and upper and lower horizontal walls connecting said vertical walls, said upper and lower walls having respective sockets which extend from an edge of said horizontal frame member and have a first tapped hole, a vertical frame member having an inner wall and flanges extending inwardly beyond the inner wall, said inner wall having a second tapped hole, and a strip having its longitudinal ends extending beyond said upper and lower walls and including a central portion which extends substantially over the distance between said upper and lower walls, said strip having a first hole formed through said central portion in registry with said first tapped hole and having a second hole formed adjacent said longitudinal end in registry with said second tapped hole, said strip being screwed to said edge of the horizontal frame member and then screwed to said inner wall of the vertical frame member.

The above and other objects and advantages of the invention will become apparent as the following description progresses when read in conjunction with the accompanying drawings illustrating preferred embodiments which the invention may assume in practice.

DETAILED DESCRIPTION OF THE PREFERRED EMBODIMENTS

Figure 1:
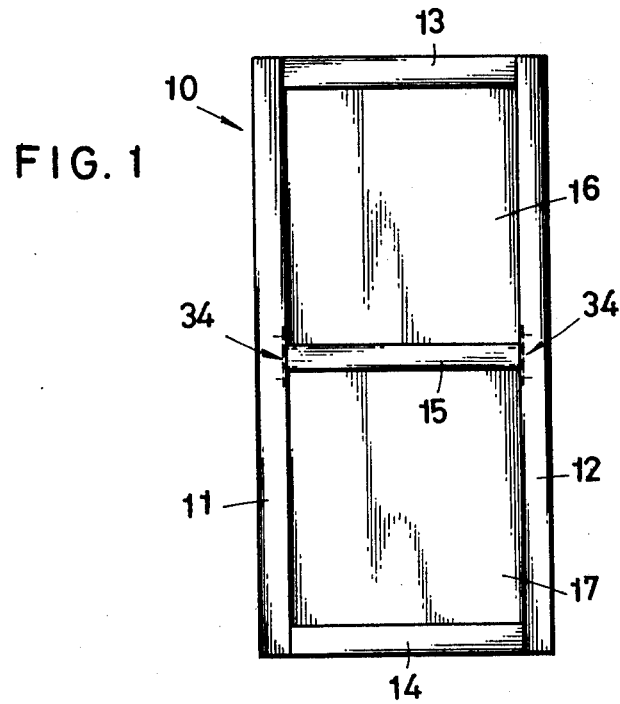
FIG. 1 is a front elevational view of a door incorporating a jointing device according to the invention.

In FIG. 1, there is shown a building component unit generally designated at 10 which is herein shown for illustrative purposes to be a door. The door 10 comprises a pair of horizontally spaced stiles 11 and 12, a pair of top and bottom rails 13 and 14 interconnecting the top ends and bottom ends of the stiles 11, 12 together, respectively, a middle rail 15 extending horizontally between and connected to the stiles 11 and 12, and a pair of panels 16 and 17 embraced peripherally by these frame members.

Figure 2:
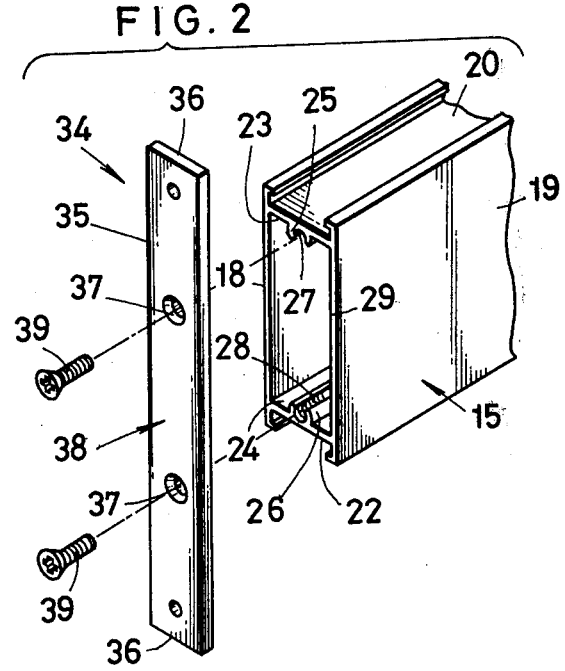
FIG. 2 is an enlarged, exploded perspective view showing the jointing device prior to attachment to a horizontal frame member of the door.
Figure 3:
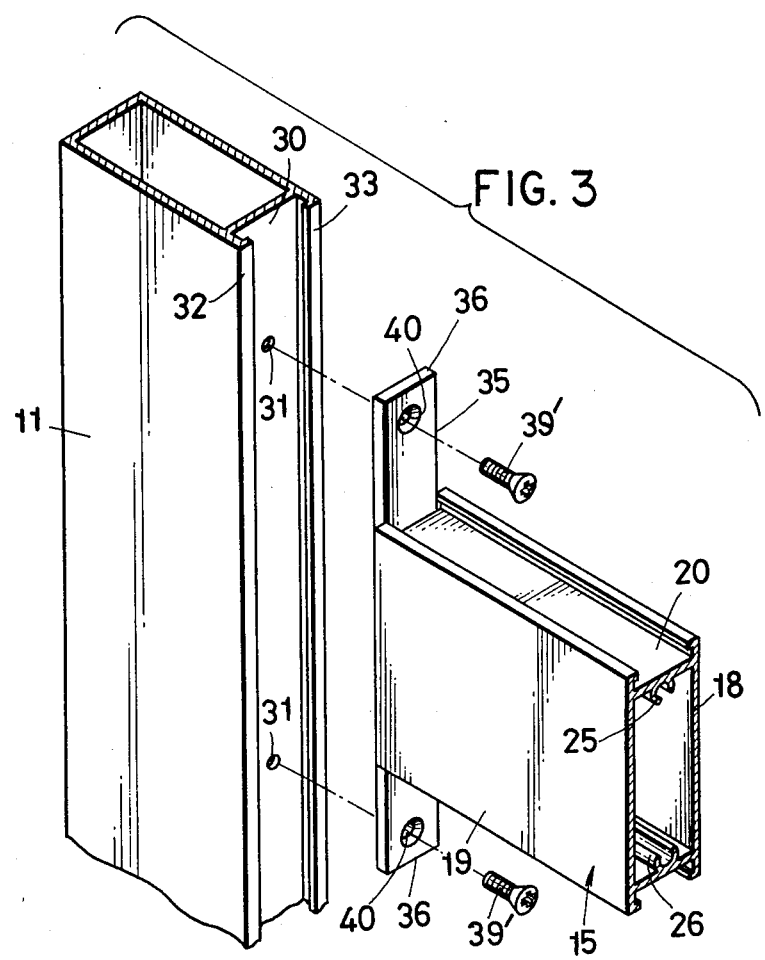
FIG. 3 is an enlarged, exploded perspective view showing the jointing device attached to the horizontal frame member and ready for attachment to a vertical frame member of the door.

As shown in FIGS. 2 and 3, the middle rail 15 is cross-sectionally rectangular and has a pair of vertical walls 18 and 19 spaced horizontally apart one from another and connected together by a pair of vertically spaced-apart upper and lower walls 20 and 22. Formed integrally with and extending longitudinally of a pair of inner surfaces 23 and 24 of the walls 20, 22 are a pair of sockets 25 and 26, respectively, having a pair of tapped holes 27 and 28 terminating at an edge 29 of the middle rail 15. The stile 11 is of a rectangular cross section and has an inner wall 30 apertured and tapped at 31 as shown in FIG. 3. The stile 11 has a pair of spaced-apart flanges 32 and 33 extending along its length and projecting inwardly beyond the inner wall 30 to receive therebetween lateral marginal edges of the panels 16, 17.

A jointing device 34 provided in accordance with the invention comprises a strip 35 having a pair of longitudinal ends 36 extending oppositely beyond the upper and lower walls 20, 22 of the middle rail 15, and having a width slightly smaller than the distance between the flanges 32 and 33 of the stile 11 for reasons described below. A first pair of countersunk holes 37 are formed through a central portion 38 of the strip 35, which central portion extends substantially over the distance between the upper and lower walls 20, 22 of the middle rail 15. The countersunk holes 37 are defined in registry with the tapped holes 27 and 28 in the respective sockets 25 and 26 for the passage of a pair of flat head screws 39 therethrough. The strip 35 is also provided with a second pair of countersunk holes 40 formed adjacent to the longitudinal ends 36 of the strip 35 and in registry with the tapped holes 31 in the stile inner wall 30 for passing further flat head screws 39' therethrough. The first pair of holes 37 and the second pair of holes 40 are countersunk in opposite directions.

When the middle rail 15 is to be coupled to the stile 11, the strip 35 is first brought into abutting engagement with the end 29 of the middle rail 15 and then the screws 39 are threadedly engaged with the tapped holes 27, 28 in the respective middle rail sockets 25, 26 through the first countersunk holes 37 in the strip 35, whereby the strip 35 is attached securely to the middle rail 15. The strip 35 having been attached to the middle rail 15 is then inserted between the spaced flanges 32, 33 of the stile 11 and brought into abutting engagement with the stile inner wall 30, whereupon the screws 39' are passed through the second countersunk holes 40 in the strip 35 and then threaded into the tapped holes 31 in the stile inner wall 30, thereby jointing the middle rail 15 to the stile 11.

Figure 4:
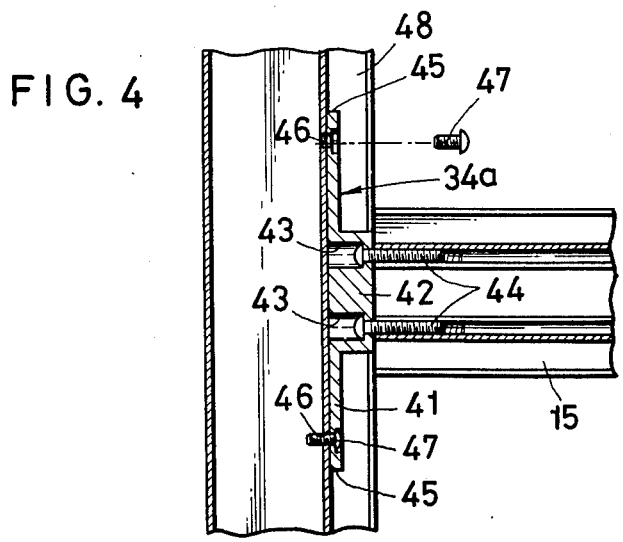
FIG. 4 is a vertical cross-sectional view of another embodiment of the jointing device which is shown as jointing the frame members together.

FIG. 4 shows another embodiment of the invention in which the jointing device 34a comprises a strip 41 having a central raised portion 42 through which a pair of holes 43 are formed. The holes 43 are counterbored remotely from the middle rail 15 so as to pass and receive therein a pair of round-head screws 44. The strip 41 is also provided adjacent its ends 45 with a pair of holes 46 therethrough which holes are counterbored in a direction opposite to the holes 43 so as to receive and retain a pair of round-head screws 47. The structure of the jointing device 34a is useful particularly where a pair of inwardly extending flanges 48 of the stile 11 project beyond the mounted strip 41 toward the middle rail 15, as contrasted to the first embodiment shown in FIGS. 2 and 3.

With this structure, the screws joining the strip 35(41) to the middle rail 15 and to the stile 11 are threaded and retained in parallel with and in the longitudinal direction of the middle rail 15, so that they can be prevented from getting loosened when subjected to repeated horizontal stresses, and hence the jointing device 34(34a) can establish a highly secure joint between the middle rail 15 and the stile 11.

What is claimed is:
1. A T-shaped structural joint, comprising:
 a. a horizontal tubular rail having a rectangular hollow cross-section, there being means defining a pair of elongated tapped sockets whose thread axis extends parallel to the length of said horizontal rail and said means being integral therewith at its upper and lower narrower interior surfaces;
 b. a vertical tubular member having a rectangular hollow cross-section, there being a pair of flanges extending along opposite edges of and perpendicularly to one of the narrow sides of said vertical members, there being a pair of tapped holes in said one side of said member spaced apart by a distance greater than the vertical height of said rail, and disposed at an intermediate location along the height of said member;
 c. a strip having a surface, which is flat throughout the extent of such strip, disposed flatwise against said one side of said member between said flanges and having apertures in registration with said tapped holes, said tubular rail engaging the opposite surface of said strip between said apertures, said strip having further apertures in registration with said tapped sockets; and
 d. screws passing through said strip into said tapped holes and said tapped sockets.

2. A T-shaped structural joint according to claim 1, said opposite surface of said strip being flat.

3. A T-shaped structural joint according to claim 1, said opposite surface of said strip having a portion, through which said further apertures pass, which is thicker than the remaining portion of said strip whereby the end of said tubular rail is offset from said one side of said member by a further amount corresponding to the added thickness of said strip.

* * * * *